US008017036B1

(12) United States Patent
Austin et al.

(10) Patent No.: US 8,017,036 B1
(45) Date of Patent: Sep. 13, 2011

(54) SINGLE STEP GAS PHASE FLAME SYNTHESIS METHOD TO PRODUCE SUB-10 NANOMETER SIZED RARE EARTH DOPED NANOPARTICLES

(75) Inventors: Robert H. Austin, Princeton, NJ (US); Shuang Fang Lim, Singapore (SG); Robert Riehn, Freital (DE)

(73) Assignee: The Trustees of Princeton University, Princeton, NJ (US)

( * ) Notice: Subject to any disclaimer, the term of this patent is extended or adjusted under 35 U.S.C. 154(b) by 780 days.

(21) Appl. No.: 12/049,124

(22) Filed: Mar. 14, 2008

Related U.S. Application Data

(60) Provisional application No. 60/894,682, filed on Mar. 14, 2007.

(51) Int. Cl.
*C09K 11/08* (2006.01)
*C09K 11/56* (2006.01)
*C09K 11/61* (2006.01)

(52) U.S. Cl. .... 252/301.4 R; 252/301.4 H; 252/301.4 S; 252/301.6 R; 252/301.6 S; 252/301.4 F; 252/301.6 F; 423/263

(58) Field of Classification Search .................. 423/263, 423/578, 472; 252/301.4 R–301.6 F
See application file for complete search history.

(56) References Cited

U.S. PATENT DOCUMENTS 4,484,943 A * 11/1984 Miura et al. .................... 75/351
5,851,507 A * 12/1998 Pirzada et al. ................ 423/659
6,153,123 A * 11/2000 Hampden-Smith et al. ........................ 252/301.4 S
6,180,029 B1 * 1/2001 Hampden-Smith et al. ...................... 252/301.4 R
6,692,660 B2 * 2/2004 Kumar ................... 252/301.4 R
7,547,431 B2 * 6/2009 Yadav et al. ............... 423/592.1
2003/0029194 A1 * 2/2003 Mangold et al. ............... 65/17.2
2006/0269483 A1 11/2006 Austin et al.
2007/0069180 A1 * 3/2007 Ju et al. .................. 252/301.4 R
2008/0075649 A1 * 3/2008 Hung et al. ................... 423/335

* cited by examiner

*Primary Examiner* — Carol M Koslow
(74) *Attorney, Agent, or Firm* — Fox Rothschild LLP; Peter J. Butch, III

(57) ABSTRACT

Methods for forming rare earth element doped oxide, oxyhalide and oxysulfide activated nanoparticles by the following method steps:

(a) providing a precursor solution of a water- or alcohol-soluble host metal salt or host metalloid compound and one or more water- or alcohol-soluble rare earth element salts in a polar solution;
(b) forming an aerosol of the precursor solution and oxygen;
(c) feeding the aerosol to a heated Laval tube
(d) igniting the aerosol with a reactive gas flame at the apex of the Laval tube to pyrolyze the salts; and
(e) expanding and cooling the pyrolysis gases emerging from the Laval tube so that rare earth element doped nanoparticles precipitate therefrom;

wherein one or more of the aerosol particle size, flow rate through the Laval tube and pyrolysis temperature are selected to provide a predetermined particle size and degree of crystallinity without particle aggregation. Rare earth element doped oxide, oxyhalide and oxysulfide activated mono-disperse nanoparticles are also disclosed.

11 Claims, 7 Drawing Sheets

SINGLE STEP GAS PHASE FLAME SYNTHESIS METHOD TO PRODUCE SUB-10 NANOMETER SIZED RARE EARTH DOPED NANOPARTICLES

CROSS-REFERENCE TO RELATED APPLICATION

The present application claims priority benefit under 35 U.S.C. §119(e) of U.S. Provisional Patent Application Ser. No. 60/894,682 filed Mar. 14, 2007, the disclosure of which is incorporated herein by reference.

STATEMENT REGARDING FEDERALLY SPONSORED RESEARCH

The U.S. Government has a paid-up license in this invention and the right in limited circumstances to require the patent owner to license others on reasonable terms as provided for by the terms of grant DMR-0213706 awarded by the National Science Foundation.

FIELD OF THE INVENTION

The present invention relates to a flame synthesis method for synthesizing mono-disperse, highly crystalline phosphorescent oxide nanoparticles with a particle size on the order of less than 10 nm. The present invention also relates to oxide nanoparticles prepared by the inventive flame synthesis method.

BACKGROUND OF THE INVENTION

Up-converting phosphor (UCP) nanoparticles based on rare-earth doped oxides have recently attracted substantial interest in both academia and industry for the purpose of labeling biological specimens. A UCP is a material which when excited in the infrared, for example with a low intensity CW diode laser, emits a number of narrow emission lines in the visible or near infrared. Because the emitted light is up-converted to shorter wavelengths than the excitation wavelength, background scattering is virtually non-existent. However, achieving mono-disperse particles with a combination of sub-10 nm size, low aggregation, size uniformity and high crystallinity required for high up-conversion efficiency and efficient surface functionalization has proven elusive to the present.

The main advantages provided by UCP nanoparticle imaging are the lack of auto-fluorescence by the specimen, the absence of bleaching, multicolor imaging and the ability to perform high resolution cathodoluminescent imaging with a Scanning Electron Microscope (SEM). Currently a great impediment to using UCP's in biological labeling applications is their size, a point in which quantum dots and organic dyes have excelled. Solution-stable, unaggregated, bright up-converting, oxide-based phosphors have previously been demonstrated for sub-micron sizes.

Because of the high degree of crystallinity required for up-conversion, attempts to synthesize smaller oxide-based up-converting particles were hindered by the need for post-synthesis annealing at a temperature above 500° C., which often leads to undesired sintering of particles. However, the annealing step is not required for the non-up-converting UV or near UV excited phosphors.

Thus, while particles around 10-17 nm based on upconverting $NaYF_4$ have recently been synthesized by sol-gel chemistry approaches, the phosphors are not water-soluble, and the toxicity is as yet undetermined. There remains a need for a method for producing highly crystalline mono-disperse up-converting phosphorescent oxide particles with a particle size on the order of less than 10 nm that are capable of forming stable suspensions or dissolving in a solvent, especially a biocompatible solvent.

BRIEF SUMMARY OF THE INVENTION

The present invention provides essentially mono-disperse sub-10 nm, low aggregating, up-converting nanophosphors that can be suspended in a solvent at very low aggregation levels. The present invention also provides a method by which such nanoparticles can be made.

According to one aspect of the present invention, a method is provided for forming rare earth element doped oxide, oxyhalide and oxysulfide activated nanoparticles by the following method steps:

(a) providing a precursor solution of a water- or alcohol-soluble host metal salt or host metalloid compound and one or more water- or alcohol-soluble rare earth element salts in a polar solution;

(b) forming an aerosol of the precursor solution and oxygen;

(c) feeding the aerosol to a heated Laval tube (d) igniting the aerosol with a reactive gas flame at the apex of the Laval tube to pyrolyze the salts; and (e) expanding and cooling the pyrolysis gases emerging from the Laval tube so that rare earth element doped nanoparticles precipitate therefrom;

wherein one or more of the aerosol particle size, flow rate through the Laval tube and pyrolysis temperature are selected to provide a predetermined particle size and degree of crystallinity without particle aggregation.

The present invention also provides methods in which the nanophosphors are imaged inside biological specimens in a 2-photon mode and in a scanning electron microscope (SEM) via cathodoluminescence.

Other features of the present invention will be pointed out in the following description referencing the drawings and claims, which disclose the principles of the invention and the best modes which are presently contemplated for carrying them out.

DETAILED DESCRIPTION

Sub-10 nm rare earth doped oxide and oxyhalide nanophosphors were synthesized by a flame spray pyrolysis process, using a precursor solution of a host metal salt and dopant salts of rare earth element(s) in a polar solvent. Suitable polar solvents used in the preparation of the precursor solution include, for example, water, ethanol, methanol, isopropanol, n-propanol, n-butanol, hexanol, ethylene glycol, and combinations thereof. The overall combined molar concentration of the oxide- and oxyhalide-forming host metal salt(s) and rare earth element salt(s) in the polar solvent can be from about 0.0001 to about 2.0 M.

The ratio of host metal salts and rare earth element salts in the solution is selected stoichiometrically to provide the desired degree of rare earth element dopant concentration in the nanoparticles. The overall combined concentration is preferably between about 0.01 to about 0.5 M and more preferably between about 0.05 to about 0.1 M. Lower concentration precursor solutions are preferred in order to produce smaller particles.

The water-soluble rare earth element dopants include, but are not limited to, salts represented by the formula:

$$REX_3.yH_2O$$

wherein RE is a rare earth element, y is 4, 5, 6 or 7 and X is an anion forming a water or alcohol soluble salt such as carbonate, hydroxide, halide, nitrate, and the like. Organic compounds capable of forming organometallic complexes cam also be used, such as 2-ethyl-hexanoic acid. Organic complexes are preferred because the compounds provide a fuel source for pyrolysis. Halide salts and other halogen sources are employed stoichiometrically to form oxyhalide salts. Likewise, hydrogen sulfide and other sulfur sources can be used stoichiometrically to form oxysulfide salts. The selection of such source components is readily performed by one of ordinary skill in the art without experimentation when guided by the present specification.

Any rare earth element or combinations thereof can be used (i.e., europium, cerium, terbium, dysprosium, holmium, erbium, thulium, ytterbium, lutetium, etc.) with europium, cerium, terbium, holmium, erbium, thulium and ytterbium being preferred, and the following combinations also being preferred: ytterbium and erbium, ytterbium and holmium and ytterbium and thulium. Strontium can also be used, and for purposes of the present invention, rare earth elements are defined as including strontium. The oxide, oxyhalide and oxysulfide forming host metal can be, but is not limited to, lanthanum, yttrium, lead, zinc, cadmium, and any of the Group II metals such as, beryllium, magnesium, calcium, strontium, barium, aluminum, radium and any mixtures thereof, or a metalloid selected from silicon and germanium.

Figure 1:
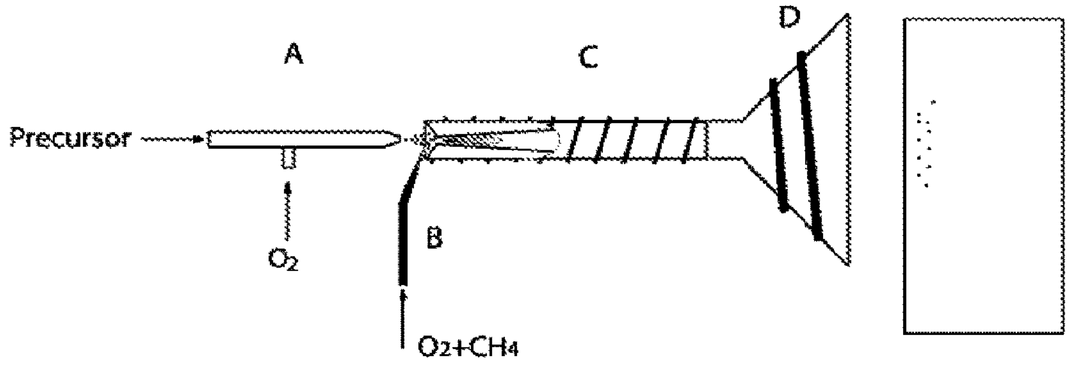
FIG. 1 is a schematic of a flame spray pyrolysis apparatus for synthesis of nanophosphors according to the present invention.

The nanophosphors are synthesized using the Laval tube depicted in FIG. 1. An aerosol of the source component precursor solution and oxygen was formed using self-aspirating atomizer A (AR27-075-FM02, MicroMist Inc.) The premixed precursor was fed into the atomizer at a constant flow rate by a syringe pump (SP101 1, World precision instruments) (not shown. The aerosol was ignited by a reactive gas flame fed by torch B positioned in front of Laval tube apex C. Nichrome heating wire was coiled around the tube. The collection end D of the Laval tube is fitted with a copper water-cooled expansion nozzle in order to allow emerging gases to expand and cool rapidly. Finally, the nanoparticles are collected, for example, on a rotating stainless steel cylindrical surface.

The heated Laval tube achieves an ultra-short exposure of the organic gaseous precursor to high temperatures, thereby preventing growth and coalescence of formed nano-particles. The collection end of the Laval tube is fitted with a water-cooled expansion nozzle in order to allow emerging gases to expand and cool rapidly, also to prevent aggregation.

Any reactive gas can be used singularly or in combination to generate the flame for reacting with the precursor solution, such as, but not limited to, hydrogen, methane, ethane, propane, ethylene, acetylene, propylene, butylenes, n-butane, iso-butane, n-butene, iso-butene, n-pentane, iso-pentane, propene, carbon monoxide, other hydrocarbon fuels, hydrogen sulfide, sulfur dioxide, ammonia, and the like, and mixtures thereof. A co-flow of oxygen with the gas may also be employed.

The Laval tube achieves an ultra-short exposure of the synthesized particles to high temperatures and thus suppresses Ostwald ripening and particle aggregation. In the inventive process, the precursor aerosol is ignited in the apex C of the Laval tube, and combustion takes place in the exit cone D. When a methane/oxygen co-flow is used, the temperature of the pyrolysis measured by a type K thermocouple was roughly 1200° C. at a distance of one inch downstream from the apex of the Laval tube. However, any temperature capable of producing the desired degree of crystallinity and particle size without particle aggregation can be employed, which can be readily determined by one of ordinary skill in the art guided by the present specification without undue experimentation.

The desired degree of crystallinity and particle size without particle aggregation can also be attenuated by selection of the appropriate flow rate through the Laval tube and particle size of the atomized droplets entering the tube, the selection of which can also be readily determined by one of ordinary skill in the art guided by the present specification without undue experimentation. One of ordinary skill in the art guided by the present specification will understand how to use one or more of pyrolysis temperature, aerosol particle size and flow rate through the Laval tube to obtain the desired particle size and degree of crystallinity Rare earth element doped nanoparticles prepared using the Laval tube of the present invention according to the method of the present invention consist essentially of essentially monodisperse particles with a crystallite particle size on the order of less than 10 nm and typically greater than 1 and less than 10 nm. The method of the present invention can be used to prepare the nanoparticles of co-pending and commonly owned U.S. application Ser. Nos. 11/494,157 and 11/537,035 on a size order of less than 10 nm. The disclosures of both applications are incorporated by reference.

Larger nanoparticles can also be prepared by the inventive method. For synthesis of 40 nm particles, rare earth salts are hydrolyzed at a high temperature in a polyol medium in order to reduce hydroxide formation. The resulting solution is heated under a nitrogen atmosphere at 100-200° C., using a heating mantle, with distillation, until the solution appeared clear. The temperature was increased to 40-80° C. and the solution is heated for about 0.2 to about six hours. During this time, the solution changes color as mixed oxides/hydroxides are formed. The glycol based precursor is premixed with a polar solvent such as methanol in order to lower its viscosity prior to spray pyrolysis.

In most biological applications, the nanophosphors have to be surface modified in order to for stable aqueous solutions or dispersions. To that end, the present invention provides silanized poly(alkylene oxide) coatings on the nanophosphors of the present invention, particularly for use with buffer solutions. However, this step is not necessary if the nanophosphors are suspended in non-aqueous solvents.

For silanization, the nanophosphors are dispersed in deionized water by probe tip sonication, followed by 30 ml of methanol and 200 μl of a poly(alkylene oxide)—silane, such as methoxy(polyethyleneoxy)propyltrimethoxysilane (PEG-silane). The suspension is stirred for 0.2 to 5 hours, heated to 40-80° C. for 0.5 to 20 minutes and then cooled. The nanophosphors are washed, with centrifugation, twice with methanol, twice with methanol:deionized water (1:1) and twice with deionized water, and finally concentrated using centrifugal filter devices. The resulting poly(alkylene oxide)—coated nanophosphors in water were transparent to the eye, and displayed luminescence when excited The nanoparticles of the present invention enable the production of bio-conjugated near it (NIR) excited luminescent nanoprobes. In particular, enhanced contrast by imaging under NIR excitation where tissue autofluorescence, which occurs under UV excitation, is nonexistent. Nonbleaching and non-blinking UPC probes can be prepared, as compared to fluorescent dye probes that bleach within minutes, especially in high-intensity cell imaging studies.

NIR can penetrate the body up to a depth of several millimeters to centimeters, which accommodates non-invasive probing. Cathodoluminescent emission under electron excitation enables exploitation of electron microscopy techniques in UPC bio-imaging to give enhanced fluorescent imaging resolution through electron microscopy on the order of nanometers. Hence, bio-labeled UPC's can be employed in multiple mode imaging under UV, NIR and electron excitation. Bio-labeling of UPC's are disclosed in the above-referenced U.S. patent application Ser. Nos. 11/494,157 and 11/537,035. The use of cathodoluminescent imaging improves resolution from roughly 200 nm in conventional optical systems to roughly 5 nm in conventional electron microscopes.

Sub-10 nm sized UPC can be potentially used in subcellular labeling. Both NIR excitable and NIR emitting probes may be developed that enable exciting photons to enter and emitting photons to exit tissue with minimal scattering. The size of the sub-10 nm UPC is on the order of proteins and viruses. Hence, there is the potential of bioconjugating the UPCs for use as sub-cellular bioprobes. The small size should also enable endocytosis.

EXPERIMENTAL

Nanophosphors were synthesized using a custom-built supersonic flame-spray pyrolysis apparatus. A self-aspirating atomizer (AR27-075-FM02, MicroMist Inc.) was used for formation of a precursor-oxygen aerosol. The premixed precursor was fed into the atomizer at a constant flow rate by a syringe pump (SP101 1, World precision instruments), with an oxygen pressure of 27 psi. The aerosol was ignited by a methane/oxygen flame ($CH_4$=5 psi and $O_2$=4 psi) positioned in front of a alumina laval tube. Nichrome heating wire was coiled around the tube. Oxygen gas (99.99%) and methane gas (~99%) were purchased from Airgas. The collection end of the laval tube was fitted with a copper water-cooled expansion nozzle in order to allow emerging gases to expand and cool rapidly. Finally, the nanoparticles were collected on a rotating stainless steel cylindrical surface.

For the precursor, 9.6 g of $Y(NO_3)_3.6H_2O$ was dissolved in 50 ml of ethanol and 11.9 ml of 2-ethylhexanoic acid (2-EHA) (99%, Sigma-Aldrich) was added, followed by heating at 60° C. to dissolve. Separately, 11.2 g of $Yb(NO_3)_3.5H_2O$ was dissolved in 50 ml of ethanol with 11.9 ml of 2-ethylhexanoic acid added. The same procedure was performed with 11.1 g of $Er(NO_3)_3.5H_2O$ dissolved in 50 ml of ethanol and 11.9 ml of 2-ethylhexanoic acid. Before use, a 60 ml precursor mixture consisting of 0.1M Yttrium 2-ethylnexanoate ($Y(2\text{-}EHA)_3$) solution in ethanol was prepared. To that solution, 0.5 mmoles each of Ytterbium 2-ethylhexanoate ($Yb(2\text{-}EHA)_3$) and Erbium 2-ethylhexanoate ($Er(2\text{-}EHA)_3$) was added as dopant.

The crystal structure of nanophosphors was determined by x-ray diffraction (XRD) (Rigaku Mini-flex X-ray Diffractometer) over a 2θ range of 15-75 degrees, with a step size of 0.04 degree and a scan speed of 0.8 degree-min$^{-1}$. The crystal size d was calculated from the full width at half maximum (FWHM) of the (222) peak using Scherrer's equation. The XRD spectrum (FIG. 4) shows several diffraction peaks that can be indexed to the standard $_{Y2O3}$ body centered cubic (bcc) phase. We studied both sub-10 nm particles, as well as 40 nm particles that were synthesized via a polyol-based precursor.

For 2-photon imaging of *C. elegans* a similar protocol used in the above-referenced U.S. patent application Ser. No. 11/537,035 was followed for inoculation of the worms and transferring onto slides. For cathodoluminescent (CL) imaging, *C. elegans* were washed with deionized water after inoculation, centrifuged gently to concentrate the worms, pipetted onto a thin layer of dilute Poly-L-lysine (9% by volume) on a gold/silicon substrate, and allowed to dry overnight. Dehydration was performed through a series of ethanol/water mixtures, beginning with 25%, 50% and 100% ethanol (anhydrous, 200 proof, 99.5~, Sigma Aldrich). About 50 microliters of ethanol/water mixture was applied each time, followed by air drying before the next application. The silicon substrates were mounted onto aluminium stubs with the use of carbon tape. Graphite adhesive was also applied to the edges of the substrates in order to enhance charge dissipation. The mounted substrates were coated with 4 nm thick iridium in order to prevent charging during imaging. The silicon substrate was coated with a 200 nm thick gold film due to the significant CL of Si/SiO2 under electron beam bombardment.

Imaging of the *C. elegans* by up-conversion luminescence with IR excitation was performed using a inverted microscope with a 60×, 1.4 N.A. oil immersion microscope objective (Nikon, Melville, N.Y.), coupled to an intensified CCD camera (Princeton Instruments, Trenton, N.J.). The worms were imaged in both bright-field and epi-fluorescence geometries. The latter was enabled by a custom-made fluorescence filter set (Chroma technology, Rockingham, Vt.), and a 20-W infrared LED laser array. The illumination intensity was about 10 W/mm$^2$.

Nanoparticle Analysis

Figure 2:
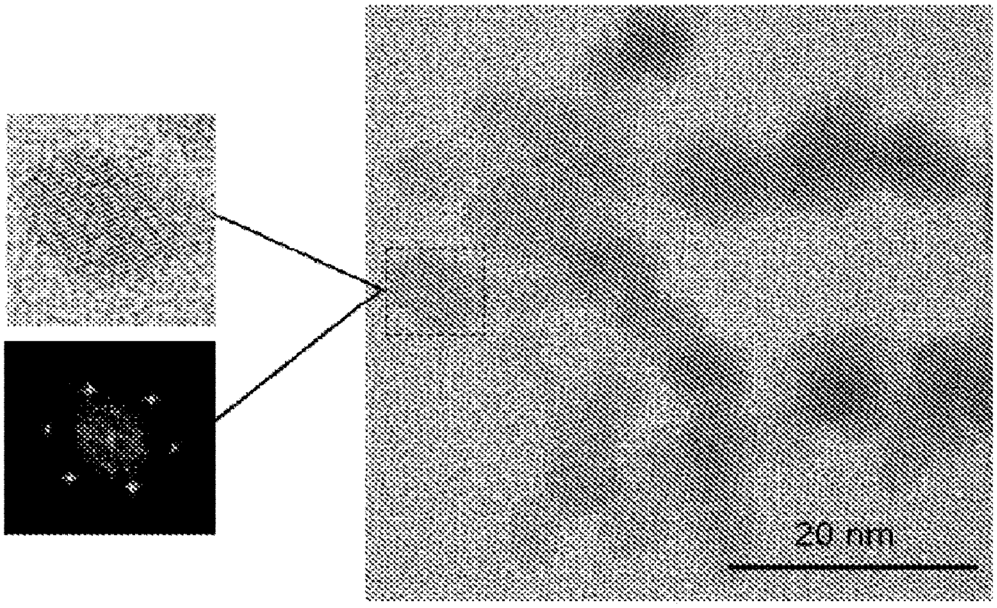
FIG. 2 shows a high-resolution transmission electron microscopy (HRTEM) of nanoparticles of the present invention prepared according to the method of the present invention.

FIG. 2 is an HRTEM image of upconverting nanophosphor from the 2-EHA based precursor, showing a selected nanoparticle and its corresponding Fourier transform diffraction pattern. The nanophosphor size and distribution were analyzed by a Philips CM200 FEG-TEM. Nanophosphors for electron microscopy were collected during spray pyrolysis directly onto TEM Cu-grids coated with holey carbon film.

Figure 3:
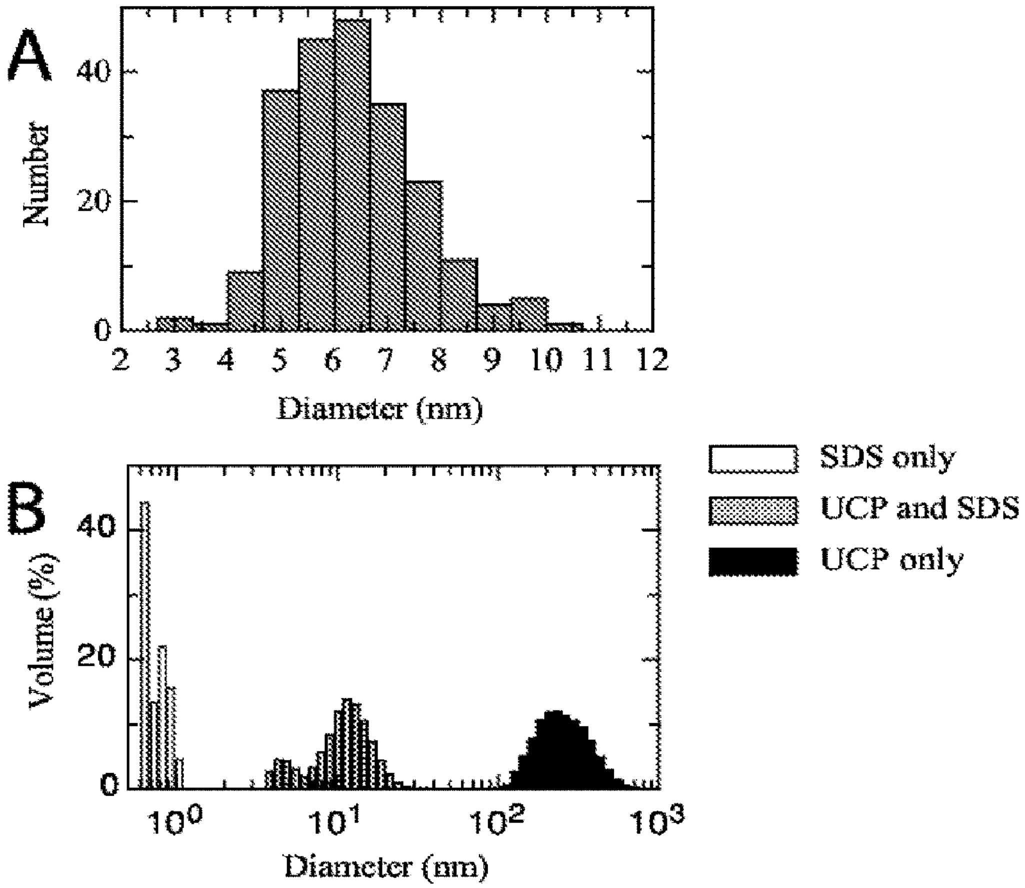
FIG. 3(A) depicts the particle size distribution of nanophosphors obtained from the 2-EHA based precursor.
FIG. 3(B) depicts the volume distribution of sub-10 nm nanophosphors suspended in THF, with and without SDS.

In the HRTEM image, facetted spheroidal nanoparticles with well-defined lattice structures are seen. The measured lattice spacing of the selected nanocrystal is 3.16 Angstroms, consistent with the known lattice spacing of the (222) plane of cubic Y2O3. That orientation also appears to be the most frequently observed lattice orientation among the other nanocrystals shown. The corresponding particle size distribution, calculated from over 220 nanoparticles, is shown in FIG. 3.A. The distribution appears to demonstrate highly uniformly sized nanocrystals, with a mean size of 6.3 nm±1.3 nm.

Figure 4:
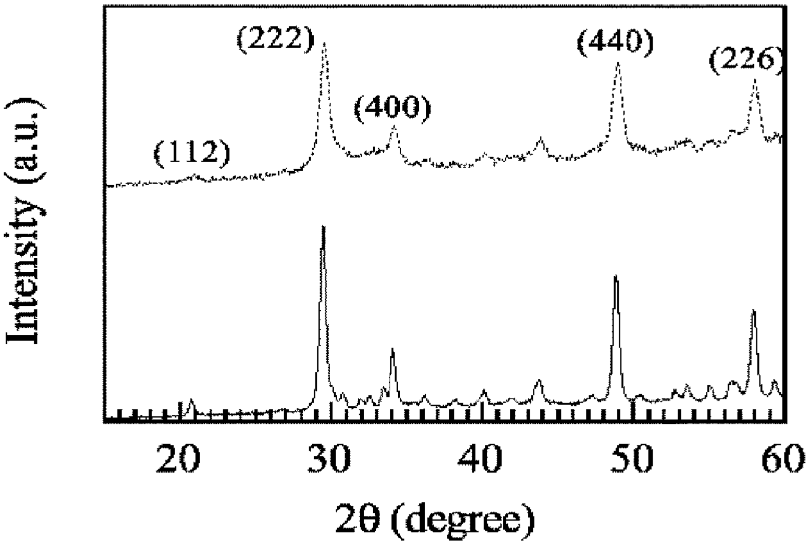
FIG. 4 depicts an XRD spectrum showing sub-10 nm particles (broken line) and 40 nm particles (solid line)

The X-ray Diffraction (XRD) spectrum in FIG. 4 shows several diffraction peaks that can be indexed to the standard $Y2O3$ body centered cubic (bcc) phase. The bcc phase combined with the spheroidal shape of the nanophosphors obtained are a result of the high synthesis temperature of our flame spray pyrolysis system. These nanophosphors also demonstrate bright upconversion as will be shown later. Also, the sub-10 nm nanophoshor XRD peak widths are broadened compared to the 40 nm one. The nanoparticle size as calculated from Scherrer's equation was about 9 nm. The $^{Y}2^{O}3$ lattice constant, obtained by calculations using XRD data of the nanocrystals is 10.5 Angstroms, which is consistent with that of bulk $Y_2O_3$.

The disparity of the sizes as measured by TEM and XRD can be attributed to the difference in quality of the nanophosphors, which is due to the different sample collection times during flame spray pyrolysis. For TEM analysis, only a small quantity of nanophosphors was collected directly onto TEM grids for about 15 seconds. In contrast, for XRD analysis, a much larger quantity of nanophosphors was required which had to be collected over several hours during spray pyrolysis. Over the long time period, a slight change in spray conditions may have produced variations in size uniformity. This results in a larger size estimated by XRD analysis. How-ever, as shown by TEM data, maintaining size uniformity is possible if spray conditions are strictly controlled. This can be achieved, for example, by installing mass flow controllers to ensure constant flame temperature and aerosol droplet size.

Elemental analysis was performed on the flame spray pyrolysed upconverting nanophosphors by Energy-dispersive X-ray spectrometry (EDX) on a PGT-IMIX PTS EDX system. The sub-10 nm phosphor showed preferential Yb (8.4 atomic percent) doping over Er (6.8 atomic percent) doping.

Figure 5:
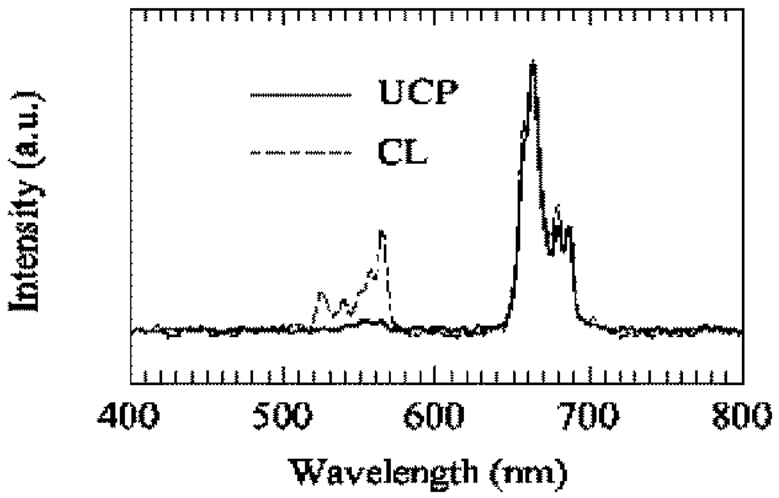
FIG. 5 depicts the up-conversion spectrum (bold line) of a sub-10 nm nanophosphor at 980 nm excitation and the cathodoluminescence spectrum (dotted line) at 27 keV acceleration.

FIG. 5.A shows the upconversion and cathodoluminescent spectra of sub-10 nm nanophosphors. CL occurs when electrons in a material are excited by an incoming electron beam. The relaxation of excited electrons result in emission of photons. The narrow spectral lines shown here are attributed to the erbium emitting centers. We observe that the transitions are almost similar for upconversion and cathodoluminesce processes except for the relative intensities. Moreover, the upconversion spectrum shows a strong red emitter.

Figure 6:
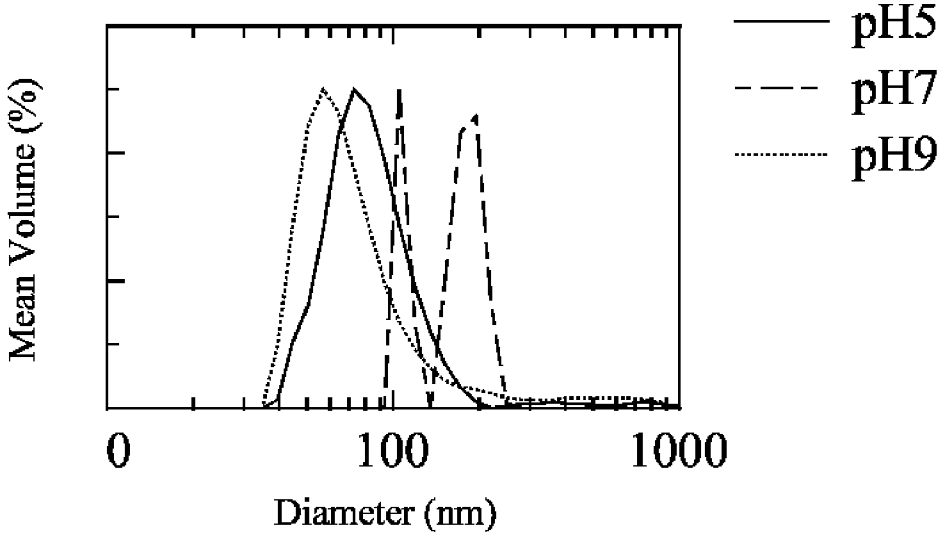
FIG. 6 depicts the volume distribution of PEG-silanized nanophosphors suspended in ultrapure water showing pH dependence. Particle size distributions in suspension were measured using dynamic light scattering on a Malvern Zetasizer Nano-ZS (Malvern Instruments Inc., Worcestershire, U.K.

FIG. 6 depicts the volume distribution of PEG-silanized nanophosphors suspended in ultrapure water showing pH dependence. Particle size distributions in suspension were measured using dynamic light scattering on a Malvern Zetasizer Nano-ZS (Malvern Instruments Inc., Worcestershire, U.K.

The viability of the PEG-coated nanophosphors was tested in the digestive system of the nematode worm *C. elegans*. FIG. 7.A shows the visible emission from the PEG-coated sub-10 nm nanophosphors. in the digestive system of the *C. elegans* worm under infrared illumination. The worms were monitored continuously for up to 24 hours without any apparent change in the phosphors, as in blinking or bleaching, and in the condition of the worms. Since the worms were deprived of food, excretion also ceased, and the nanophosphors were still retained in them.

FIG. 7.B shows the cathodoluminescence (CL) image of a 40 nm nanophosphor fed worm. The 40 nm nanophosphors were used instead of the sub-10 nm ones because of the low collection efficiency of our current collection optics. Since the 40 nm nanophosphors were not observed to exhibit fast dissolution in water as do the sub-10 nm ones, no silanization of these nanophosphors were performed. Most of the nanophosphors appear to have been clustered behind the pharynx of the worm. Since the CL signal was collected simply by a photomultiplier tube (PMT) without any special filters, many possibilities for optimization of resolution can be employed in our future work.

Figure 7A:
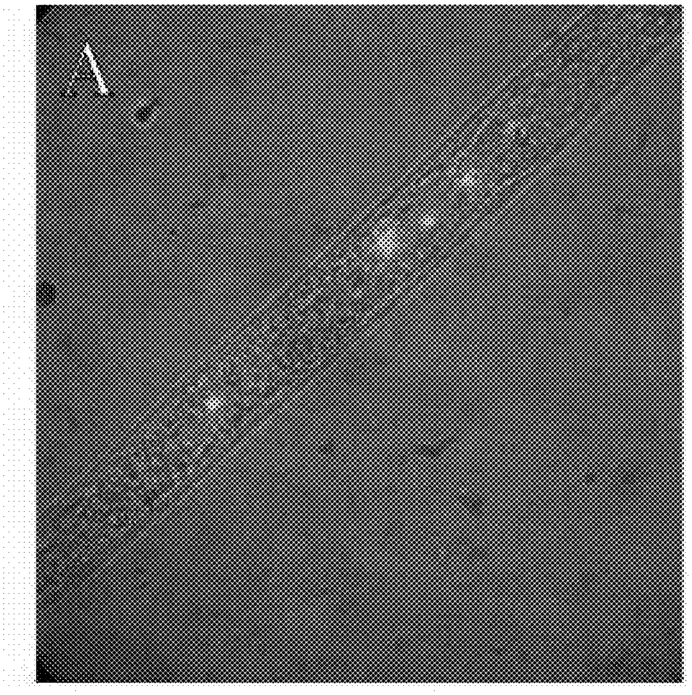
FIG. 7A depicts PEG-coated sub-10 nm nanophosphors in the digestive system of the nematode worm *C. elegans* and FIG. 7.B shows the cathodoluminescence (CL) image of a 40 nm nanophosphor fed worm.
Figure 7B:
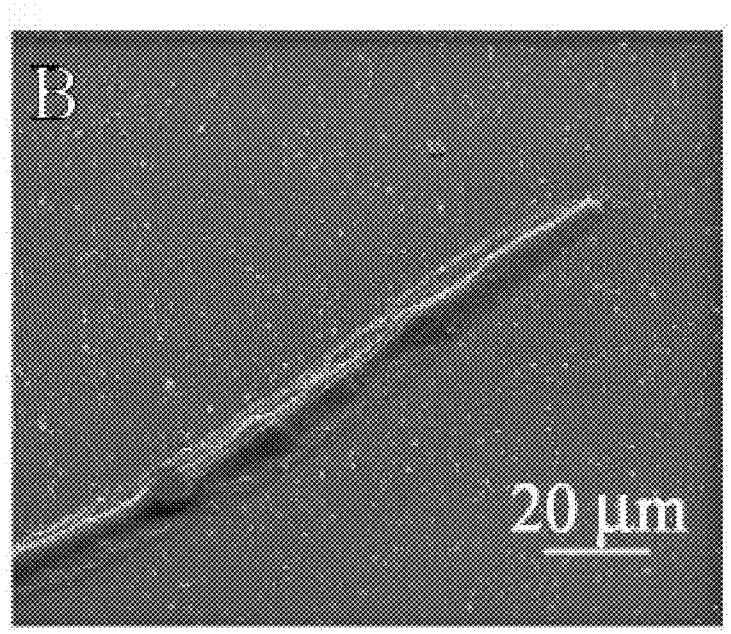

More specifically, FIG. 7A shows a false color two-photon images of *C. elegans* at 980 nm excitation with green representing the bright field and red for the PEG-silanized sub-10 nm nanophosphor emission at 60× magnification. FIG. 7B shows a combined image of 40 nm nanophosphor fed worm with grey representing the SEM image, and red representing the CL image. The CL image was obtained by monitoring the total light intensity from the sample using a photomultiplier tube, without any color filtering. The sample was tilted at a 45 degree angle to the incoming beam, leading to some topography-induced contrast in the CL image.

Apart from the common problem of sintering in high-temperature synthesized materials, further aggregation is likely to occur when nanoparticles are suspended in solution. The resulting highly aggregated nanophosphors would be rendered impractical for further processing such as bioconjugation. We investigated this issue by suspending as-synthesized nanophosphors in tetrahydrofuran (THF), with and without stabilisation, and measuring the size using dynamical light scattering (FIG. 3.B). Sodium dodecyl sulfate (SDS) was used because of a previously determined slightly positive zeta-potential (about 3.9 mV) of bare nanophosphors in deionized water. SDS therefore stabilizes the nanophors electrostatically.

A systematic study was carried out (not shown), whereby the concentrations of the SDS and the upconverting nanophosphors were varied, showed that at about 0.01M SDS in THF, aggregation of the nanophosphors can be reproducibly reduced. We also found that SDS stabilization does not work as well in methanol. Typically, about 1 to 2 mg of nanophosphors were added to the SDS/THF solution, and stirred overnight. The solution was then allowed to equilibrate for several hours before use. When stored over several days sometimes the SDS was observed to settle to the bottom of the dispersion. In that case, samples for sizing measurements were obtained from the clear portion of the dispersion without centrifugation or filtering.

We found that in the absence of SDS, particles agglomerate into clusters of size 100 nm or more. When SDS was used, no further peaks were observed in the 100 nm to 1000 nm range. Typically, at 0.01M SDS and nanophosphor concentration of 0.01 mg/ml, a peak located at roughly 10 nm was obtained, close to that determined using HRTEM and XRD. Although the distribution indicates a small amount of nanoparticles below 10 nm in size, the rest appears to be consistent with two nanoparticle or larger clusters. A control experiment using SDS in THF solution only, confirmed that the UCP/SDS/THF distribution can indeed be attributed to the nanophosphors. These dispersion experiments in THF, demonstrate both a low level of aggregation in our as-synthesized nanophosphors and also facilitate further surface fictionalization work in the near future.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A method for forming rare earth element doped oxide, oxyhalide and oxysulfide activated nanoparticles, said method comprising the steps of:

(a) providing a precursor solution comprising a water- or alcohol-soluble host metal salt or host metalloid compound and one or more water- or alcohol-soluble rare earth element salts in a polar solution;

(b) forming an aerosol comprising said precursor solution and oxygen;

(c) feeding said aerosol to a heated Laval tube (d) igniting said aerosol with a reactive gas flame at the apex of said Laval tube to pyrolyze said salts; and (e) expanding and cooling the pyrolysis gases emerging from the Laval tube so that rare earth element doped nanoparticles precipitate therefrom;

wherein one or more of the aerosol particle size, flow rate through the Laval tube and pyrolysis temperature are selected to provide a predetermined particle size and degree of crystallinity without particle aggregation.

2. The method of claim 1, wherein one or more of pyrolysis temperature, aerosol particle size and flow rate through the Laval tube are selected to provide essentially monodisperse activated nanoparticles with a dispersed crystallite particle size below 10 nm.

3. The method of claim 1, wherein said host metal is selected from the group consisting of lanthanum, yttrium, lead, zinc, cadmium, beryllium, magnesium, calcium, strontium, barium, aluminum, radium and mixtures thereof.

4. The method of claim 1, wherein said metalloid compound comprises silicon or germanium.

5. The method of claim 1, wherein said polar solvent is selected from the group consisting of water, ethanol, methanol, isopropanol, n-propanol, n-butanol, hexanol, ethylene glycol, and combinations thereof.

6. The method of claim 1, wherein said rare earth element dopant salts are represented by the formula:

$$REX_3.yH_2O$$

wherein RE is a rare earth element, y is 4, 5, 6 or 7 and X is an anion forming a water or alcohol soluble carbonate, hydroxide, halide or nitrate salt.

7. The method of claim 1 or claim 6, wherein said rare earth element dopant is selected from the group consisting of europium, cerium, terbium, holmium, erbium, thulium, ytterbium and combinations thereof.

8. The method of claim 7, wherein said rare earth element dopant is selected from one of the following combinations: ytterbium and erbium, ytterbium and holmium or ytterbium and thulium.

9. The method of claim 1, wherein said reactive gas is selected from the group consisting of hydrogen, methane, ethane, propane, ethylene, acetylene, propylene, butylenes, n-butane, iso-butane, n-butene, iso-butene, n-pentane, iso-pentane, propene, carbon monoxide, hydrocarbon fuels, hydrogen sulfide, sulfur dioxide, ammonia, and mixtures thereof.

10. The method of claim 1, wherein said reactive gas is supplied with a co-flow of oxygen.

11. The method of claim 1, wherein the overall combined molar concentration of host metal salt or host metalloid compound and rare earth element salt(s) in the polar solvent is from about 0.0001 to about 2.0 M.

* * * * *